United States Patent
Dai

(10) Patent No.: US 9,652,855 B2
(45) Date of Patent: May 16, 2017

(54) IMAGE PROCESSING APPARATUS THAT IDENTIFIES IMAGE AREA, AND IMAGE PROCESSING METHOD

(71) Applicant: CANON KABUSHIKI KAISHA, Tokyo (JP)

(72) Inventor: Xiaoyan Dai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 14/606,717

(22) Filed: Jan. 27, 2015

(65) Prior Publication Data

US 2015/0213611 A1 Jul. 30, 2015

(30) Foreign Application Priority Data

Jan. 29, 2014 (JP) ................................ 2014-014955

(51) Int. Cl.
*G06T 7/00* (2006.01)

(52) U.S. Cl.
CPC .......... *G06T 7/0083* (2013.01); *G06T 7/0081* (2013.01); *G06T 2207/10024* (2013.01); *G06T 2207/10028* (2013.01); *G06T 2207/20144* (2013.01)

(58) Field of Classification Search
CPC . G06T 2207/10028; G06T 2207/20144; G06T 7/0081; G06T 7/0083
See application file for complete search history.

(56) References Cited

U.S. PATENT DOCUMENTS

| 8,204,308 B2 * | 6/2012 | Yamada | G06T 7/0081 382/181 |
| 8,391,594 B1 * | 3/2013 | Wang | G06T 7/0083 382/100 |
| 2013/0170742 A1 * | 7/2013 | Dai | G06T 7/0079 382/164 |

FOREIGN PATENT DOCUMENTS

JP 2010066802 A 3/2010

OTHER PUBLICATIONS

Chuang, et al., A Bayesian Approach to Digital Matting, http://grail.cs.washington.edu/projects/digital-matting/, Microsoft Research, Redmond, WA.
Boykov, Y., and Jolly, Interactive graph cuts for optimal boundary and region segmentation of objects in N-D images.In Proceedings of IEEEInt. Conf. on Computer Vision, 2001.
Rother et al., Grabcut—Interactive Foreground Extraction Using Iterated Graph Cuts, ACM Trans. Graph., vol. 23, No. 3, 2004, pp. 309-314.
Lgrady, T Schiwietz, S Aharon, Random Walks for Interactive Alpha-matting, Proceedings of VIIP, 2005.

\* cited by examiner

*Primary Examiner* — Siamak Harandi
(74) *Attorney, Agent, or Firm* — Canon USA, Inc. I.P. Division

(57) ABSTRACT

An image processing apparatus including: an acquisition unit configured to acquire a boundary between a target area and a non-target area from an image; a setting unit configured to set an undefined area on the periphery of the boundary in a width based on feature quantities of peripheral pixels of the boundary; and a generating unit configured to define an area excluding the undefined area from the target area as the foreground area, define an area excluding the undefined area from the non-target area as the background area, and generate area information that specifies the foreground area, the background area, and the undefined area.

13 Claims, 19 Drawing Sheets

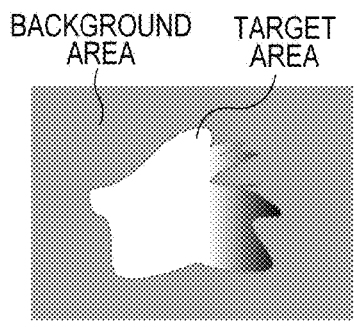
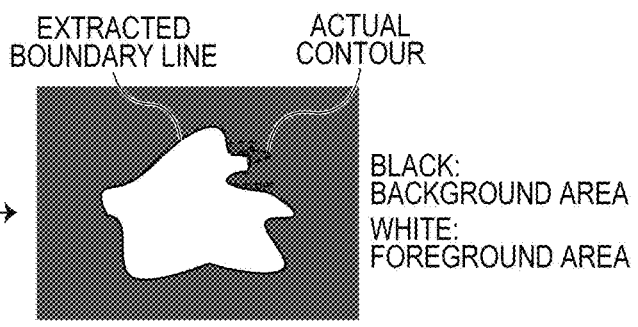
FIG. 1A PRIOR ART
FIG. 1B PRIOR ART

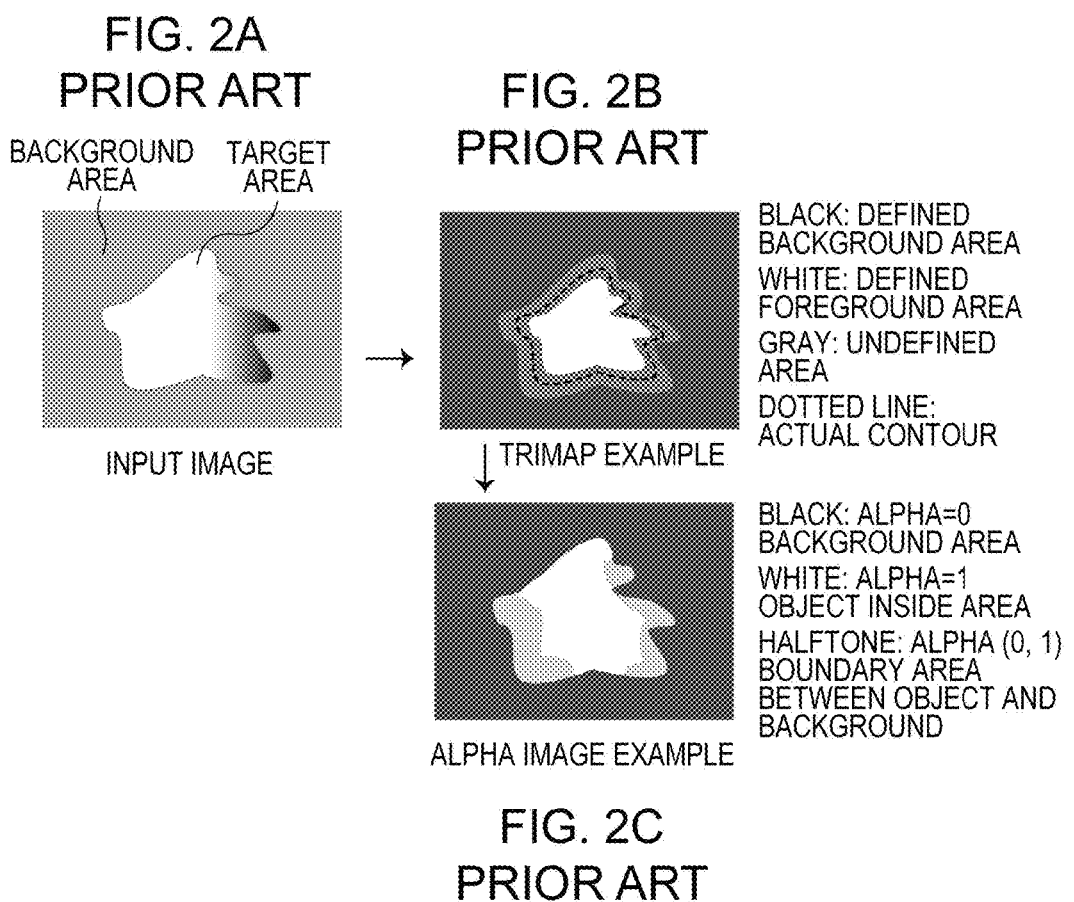

FIG. 3A
PRIOR ART
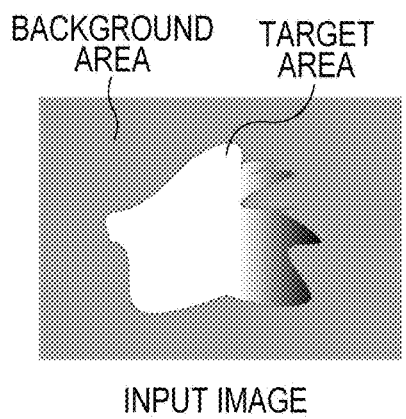
INPUT IMAGE
BACKGROUND AREA   TARGET AREA
FIG. 3B
PRIOR ART
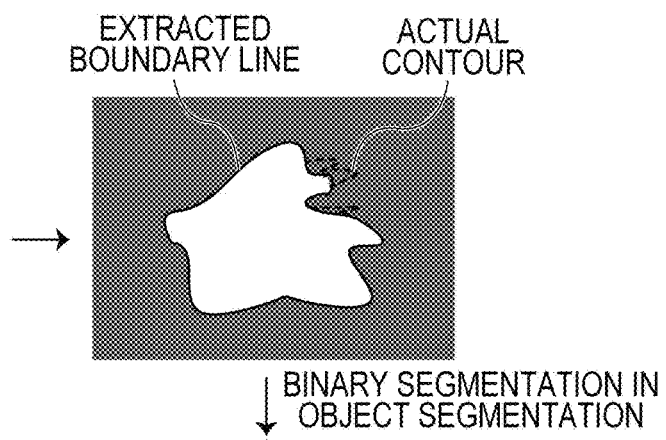
EXTRACTED BOUNDARY LINE   ACTUAL CONTOUR
↓ BINARY SEGMENTATION IN OBJECT SEGMENTATION
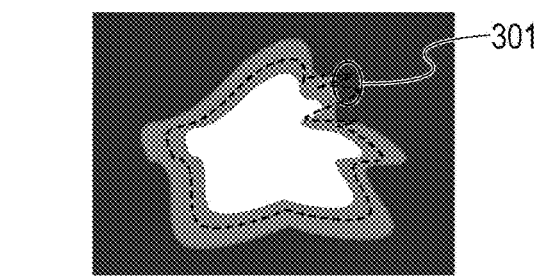
—301
TRIMAP EXAMPLE GENERATED BASED ON RESULT OF SEGMENTATION
FIG. 3C
PRIOR ART FIG. 4A
PRIOR ART
FIG. 4B
PRIOR ART
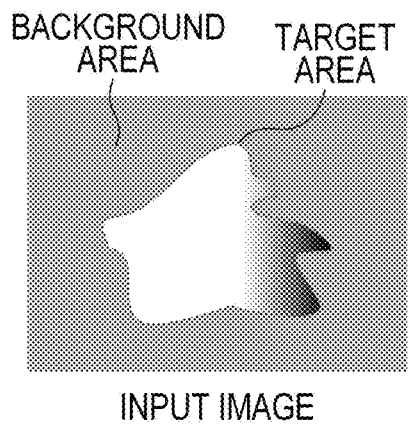
INPUT IMAGE
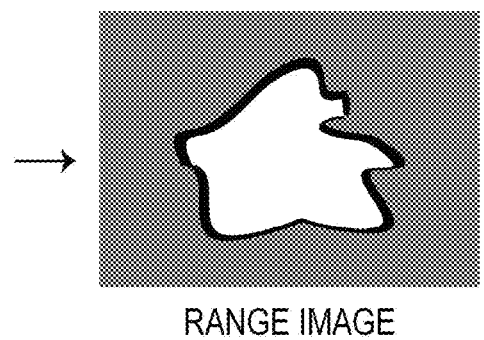
RANGE IMAGE FIG. 21A    FIG. 21B
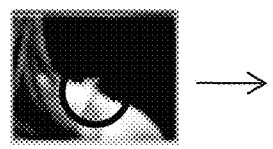 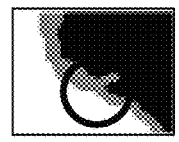
FIG. 22A    FIG. 22B
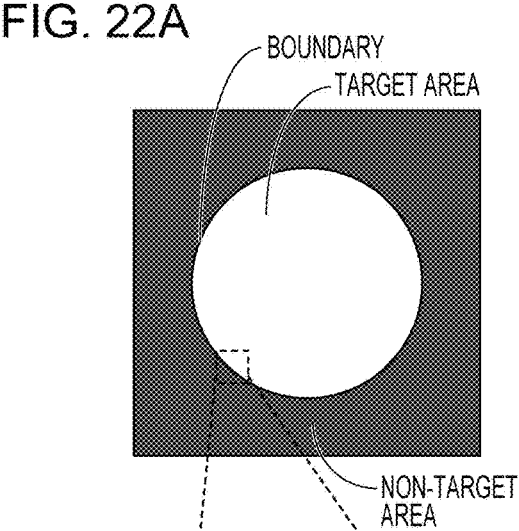 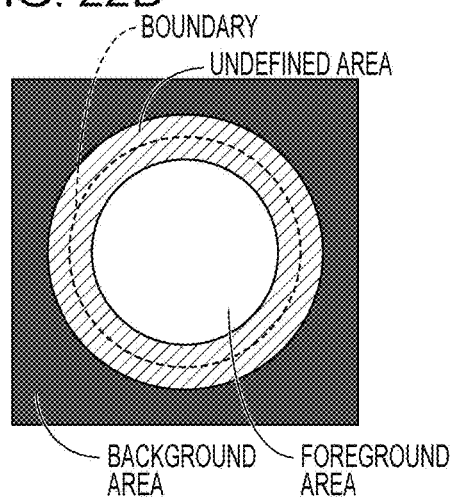
FIG. 22C

IMAGE PROCESSING APPARATUS THAT IDENTIFIES IMAGE AREA, AND IMAGE PROCESSING METHOD

BACKGROUND OF THE INVENTION

Field of the Invention

The present invention relates to an image processing apparatus that identifies a target area and a background area in an image, and also relates to an image processing method.

Description of the Related Art

Broadly classified, there are two types of techniques for extracting a target area in an image: object segmentation and alpha matting. These techniques are used to, for example, recognize, understand and retrieve an image, generate a synthesized image, and refocus a subject.

Object segmentation is a technique to cut a target area out of a background area and generate a binary segmented image. Typical methods thereof may include the chroma key method and the background difference method that are standard methods used by filmmakers. There is also a method that requires no specific background. In the method, a user designates a range in which an object is included, or paints a part of a background and a part of the object, and extracts a target area based on color information (see BOYKOV Y., and JOLLY, Interactive graph cuts for optimal boundary and region segmentation of objects in N-D images, Proceedings of IEEE Int. Conf. on Computer Vision, 2001., ROTHER et al., Grabcut—Interactive Foreground Extraction Using Iterated Graph Cuts, ACM Trans. Graph., vol. 23, No. 3, 2004, pp. 309-314).

Object segmentation for binary segmentation of the target area and the background area has difficulty in extraction of a target area with precision in an image including an object with a complicated shape, such as hair and fur, and an object with a translucent portion.

FIGS. 1A and 1B illustrate an example of a binary segmented image generated by object segmentation. FIG. 1A is an example of an input image and FIG. 1B is an example of a result of binary segmentation. An extracted target area is illustrated by white color and a background area is illustrated by black color. A boundary between the target area and the background area is illustrated by a solid line and a contour of an actual object is illustrated by a dotted line.

Alpha matting is a technique to estimate transparency (hereafter, referred to also as "alpha") of a pixel located on a boundary between the target area and the background area, and extract the target area more precisely. Basically, in a matting process, a ternary trimap image is generated ("ternary" corresponds to an obviously target area, an obviously background area, and an area that is not defined to belong to either of the target area and the background area), alpha of a pixel located in an undefined area is estimated, and an alpha image is generated. Hereinafter, an obviously target area is referred to also as a "defined foreground area," an obviously background area is referred to also as a "defined background area," and an area that is not defined to belong to either of the target area and the background area is referred to also as an "undefined area."

Alpha expresses a probability that a pixel belongs to a foreground or a background and may also be considered as a ratio of composition of colors of the foreground and the background. If alpha of a pixel located in the defined foreground area is set to 1 and alpha of a pixel located in the defined background area is set to 0, alpha of a pixel in the undefined area is a value between 0 and 1, which means that the foreground shields a part of the background at that pixel. Several alpha estimation methods are proposed (see L Grady, T Schiwietz, S Aharon, Random Walks for Interactive Alpha-Matting, Proceedings of VIIP, 2005., Yung-Yu C, et al. A Bayesian Approach to Digital Matting, Proceedings of IEEE Computer Vision and Pattern Recognition, Vol. II, 264-271, 2001).

Typically, an input image is separated into the foreground color and the background color based on a theory that a given input image includes a linear mixture of a foreground color and a background color, and alpha in an undefined area is estimated in accordance with the separation result. Every alpha estimation method requires input of a trimap. Further, precision in alpha estimation is greatly influenced by the quality of the trimap.

FIGS. 2A to 2C illustrate an example of a trimap image and an example of alpha estimation. FIG. 2A is an example of an input image. In an example of a trimap of FIG. 2B, a defined foreground area is illustrated by black color, a defined background area is illustrated by white color, and an undefined area is illustrated by gray color. As a reference, a contour of an object is illustrated by a dotted line. FIG. 2C is an example of an alpha image generated by alpha estimation. Alpha of the defined foreground area in FIG. 2B is 1 and the area is illustrated by white color. Alpha of the defined background area in FIG. 2B is 0 and the area is illustrated by black color. An alpha estimation result of the undefined area in FIG. 2B is a value between 0 and 1, and the area is illustrated by gray color that is a neutral color of white and black.

The trimap may be generated manually or automatically. In manual generation, a user operates, for example, a paint tool to set an area considered to be a foreground to a defined foreground, set an area considered to be a background to a defined background, set an area located near a contour of a target area as an undefined area, and paint a ternary trimap image. Regarding automatic generation, the following methods are mainly proposed.

In automatic generation based on a binary segmented image generated by object segmentation, an undefined area of predetermined width is set on a boundary between a target area and a background area extracted by segmentation. Then a trimap image that consists of a pixel belonging to the foreground area, a pixel belonging to the background area, and a pixel belonging to the undefined area is generated.

In automatic generation based on both object segmentation and alpha matting, a trimap is generated first by the above automatic generation method and then alpha is estimated. Then a pixel of which alpha is between 0 and 1 and is located near a predetermined elliptical set by an edge flow vector is set to be an undefined pixel and is updated. Then it is determined that the trimaps before and after the update are the same or substantially the same (i.e., it is determined that the trimap has been converged). If the trimap has not been converged, the above series of processes, i.e., alpha estimation, update of the trimap, and convergence determination, are repeated (see Japanese Patent Laid-Open No. 2010-66802).

In manual generation of a tri-map image, a user needs to correctly set the thickness of the boundary area along the contour of the target area, which requires considerable skill with tools. Further, the user often needs to repeat trial and error with objects having complicated shapes, which makes the input operation difficult and complicated.

In automatic generation of the tri-map image based on binary segmentation by object segmentation, objects with complicated shapes cannot be extracted highly precisely.

Therefore, an undefined area set in a uniform width as a result, a defined foreground area and a defined background area derived therefrom may not be correct. If the width of the undefined area is narrowed uniformly, an area near the true contour of the object is not necessarily included in the undefined area. If the width of the undefined area is uniformly large, the true contour of the object is included in the undefined area. In that case, however, an error in color estimation of a pixel in the undefined area and an error in alpha estimation are diffused greatly. An outer edge portion of an object (i.e., a target) is not necessarily uniform in feature. If an undefined area is set in an outer edge portion having nonuniform feature, correct alpha estimation becomes difficult.

FIGS. 3A to 3C illustrate an example of a trimap image generated based on binary segmentation by object segmentation. FIG. 3A is an example of an input image. In an example of binary segmentation of FIG. 3B, an extracted target area is illustrated by white color, a background area is illustrated by black color, a boundary between a target area and the background area is illustrated by a solid line, and a contour of an actual object is illustrated by a dotted line. It is turned out that binary segmentation between an object and the background area differs from a contour of an actual object. In an example of a trimap of FIG. 3C, a defined foreground area is illustrated by black color, a defined background area is illustrated by white color, and an undefined area is illustrated by gray color. In an alpha estimation process using this trimap, transparency of only the pixel in the gray area is estimated. Therefore, an area surrounded by an ellipse 301 that must have been a part of the object, i.e., an area near the true boundary, is included in the black defined background area and correct alpha estimation therefor is not possible.

In automatic generation of a tri-map image based on both object segmentation and alpha matting, after the generation of an initial trimap by object segmentation, update of the trimap by matting and a matting process using the updated trimap is repeated. Such an operation imposes large processing load and, therefore, it is difficult to perform alpha estimation with high precision.

In recent years, estimation of a distance, i.e., a depth in an image has become possible by, for example, using a distance measurement sensor mounted on a monocular camera, or using a multi-viewpoint image acquired from a plurality of cameras. Especially in stereo photographing, for example, distance estimation may be performed using images in which the same object is included, distance estimation values may be compared while changing reference images, and distance reliability may be calculated using the distance estimation values (i.e., if the estimated values are close to each other, distance reliability is high and, if the estimated values are not close to each other, distance reliability is low). Such distance information, i.e., the distance value or distance reliability, is used for image processing as useful information.

FIGS. 4A and 4B illustrate examples of an input image and a range image. FIG. 4A is an example of an input image, in which a periphery of the subject is unclear and has partially low brightness. FIG. 4B is an example of a result of distance estimation of the example of the input image, in which a distance is illustrated by a degree of brightness. It is considered that the distance to an imaging apparatus is shorter as the degree of brightness is higher. A portion in which distance estimation is not performed or in which the distance is infinity is illustrated by black color. It is understood from this example that correct distance estimation is difficult in an area near a boundary between a subject and a background area. From this tendency, area estimation near the true boundary becomes possible. In this example, in order to make the feature of the distance information understandable, a subject portion, a background portion, a boundary portion between the subject and the background, and a portion of the subject with low brightness are illustrated each having a uniform distance value. However, since an actual distance estimation image includes a great deal of noise having a distance value different in every pixel, area estimation in an area near the boundary is insufficient with only the distance information.

The present invention generates a trimap with a nonuniform width depending on features of an image, based on boundary information and distance information of a target area and the rest of areas, and enables extraction of a target area in a simple and highly precise manner.

SUMMARY OF THE INVENTION

An embodiment of the present invention is an image processing apparatus including: an acquisition unit configured to acquire a boundary between a target area and a non-target area from an image; a setting unit configured to set an undefined area on the periphery of the boundary in a width based on feature quantities of peripheral pixels of the boundary; and a generating unit configured to define an area excluding the undefined area from the target area as the foreground area, define an area excluding the undefined area from the non-target area as the background area, and generate area information that specifies the foreground area, the background area, and the undefined area.

Further features of the present invention will become apparent from the following description of exemplary embodiments with reference to the attached drawings.

BRIEF DESCRIPTION OF THE DRAWINGS

FIGS. 1A and 1B illustrate an example of a binary segmented image generated by object segmentation.

FIGS. 2A to 2C illustrate an example of a trimap image and an example of alpha estimation.

FIGS. 3A to 3C illustrate an example of a trimap image generated based on binary segmentation by object segmentation.

FIGS. 4A and 4B illustrate examples of an input image and a range image.

FIGS. 21A and 21B illustrate an example of a trimap correction process in the fourth embodiment.

FIGS. 22A to 22C illustrate examples of a target area, a boundary line, a non-target area, a foreground area, an undefined area, a background area, and other elements.

DESCRIPTION OF THE EMBODIMENTS

Hereinafter, a subject extraction process using an image processing apparatus according to the present invention is described in detail with reference to the drawings. The components described in the present embodiment are illustrative only and the technique of the present invention is defined only by the claims and not limited by the following embodiments.

First Embodiment

Figure 5:
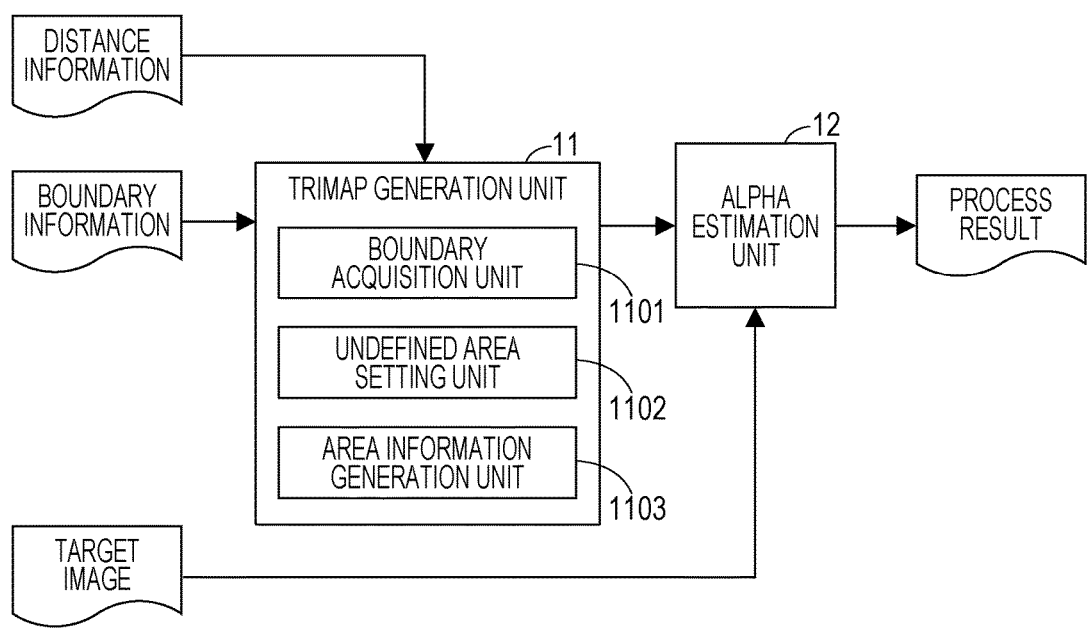
FIG. 5 is a block diagram illustrating a functional configuration of an image processing apparatus according to a first embodiment.

FIG. 5 is a block diagram illustrating a configuration of an image processing apparatus according to an embodiment of the present invention.

Configuration of Image Processing Apparatus

The image processing apparatus is provided with a trimap generation unit 11 and an alpha estimation unit 12.

The trimap generation unit 11 uses boundary information and distance information as input, and generates a ternary trimap image that consists of a defined foreground area, a defined background area, and an undefined area.

As illustrated in FIG. 22A, the boundary information relates to a boundary between a target area and the rest of the areas (i.e., a non-target area).

As illustrated in FIG. 22B, the foreground area is an area excluding the undefined area from the target area, and the background area is an area excluding the undefined area from the non-target area.

The boundary information may be binary information indicating whether a pixel exists in the target area or in the non-target area as illustrated in FIG. 22C, may be a boundary line, or may be a list of boundary points. The distance information may be a distance between each pixel in the target image and the image capturing apparatus or may be distance reliability.

The trimap generation unit 11 is provided with a boundary acquisition unit 1101, an undefined area setting unit 1102, and an area information generation unit 1103.

The boundary acquisition unit 1101 acquires a boundary between the target area and a non-target area other than the target area. The undefined area setting unit 1102 sets the undefined area on the periphery of the boundary acquired by the boundary acquisition unit 1101. The undefined area setting unit 1102 sets a width of the undefined area on the periphery of the boundary based on feature quantities of peripheral pixels of the boundary acquired by the boundary acquisition unit 1101.

The area information generation unit 1103 defines an area excluding the undefined area from the target area as the foreground area, and defines an area excluding the undefined area from the non-target area as the background area. Then, the area information generation unit 1103 generates area information that specifies the foreground area, the background area, and the undefined area.

The alpha estimation unit 12 estimates alpha using color information of each pixel, and extracts a subject in the undefined area in the ternary trimap generated by the trimap generation unit 11.

System Configuration

Figure 6:
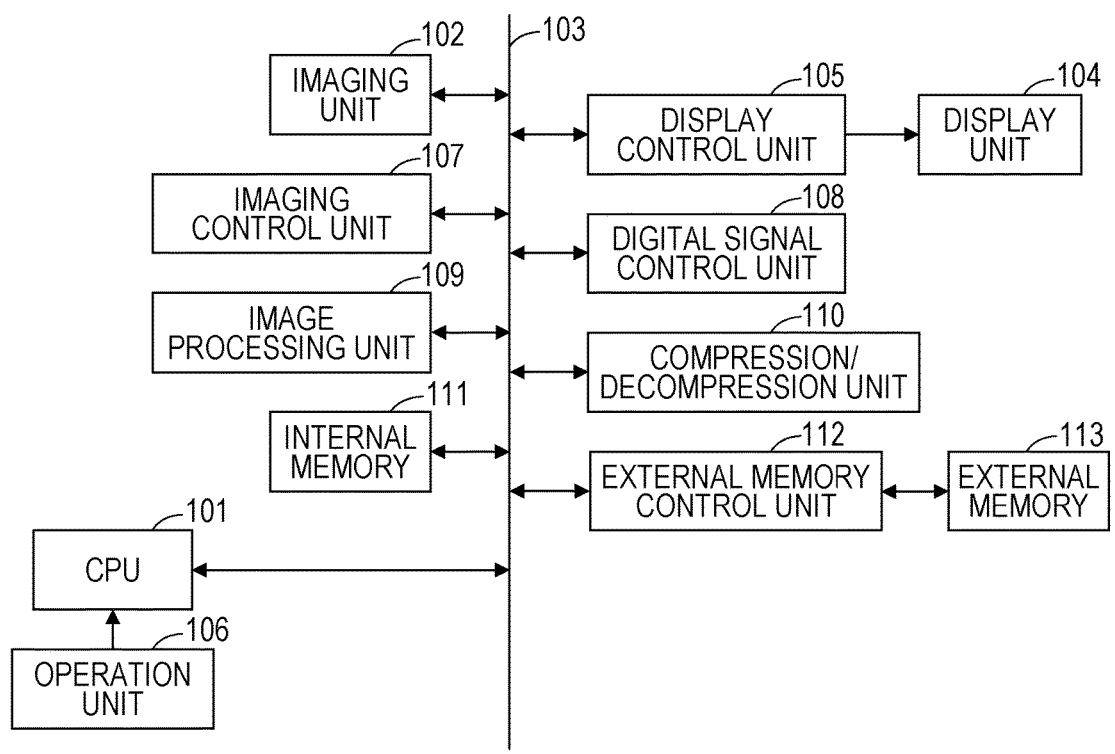
FIG. 6 is a block diagram illustrating a configuration of a main part of the image processing apparatus according to the first embodiment.

FIG. 6 is a block diagram illustrating a configuration of a main part of the image capturing apparatus that is an embodiment of the image processing apparatus according to the first embodiment of the present invention.

A central processing unit (CPU) 101 collectively controls the parts described below.

An image capturing unit 102 acquires range image data.

A bus 103 is a transfer path of various data. For example, digital data acquired by the image capturing unit 102 is transmitted to each predetermined part via the bus 103.

A display unit 104 displays captured images or characters. The display unit 104 may be, for example, a liquid crystal display. The display unit 104 may be a touchscreen display.

A display control unit 105 controls display of the captured images or characters displayed on the display unit 104.

An operation unit 106 receives user instruction. The operation unit 106 includes buttons and image capturing mode dials. The configuration set in this operation controls predetermined processes via the CPU.

A manual designation unit for designating an area in the present embodiment is easily implemented by using the display control unit 105 and the operation unit 106.

An image capturing control unit 107 controls an image capturing system based on an instruction from the CPU 101. The control includes focusing, opening and closing a shutter, and adjusting a diaphragm.

A digital signal control unit 108 performs various processing to the digital data received via the bus 103. The processing includes white balance processing, gamma processing, and noise reduction processing.

An image processing unit 109 performs image processing in accordance with an image acquired by the image capturing unit 102, a digital image output from an image output from the digital signal control unit 108, or a user instruction received via the operation unit 106.

A compression/decompression unit 110 converts digital data or an image processing result into a file format, such as JPEG, MPEG, or vector graphics, or performs encoding control.

An internal memory 111 functions as, for example, a main memory and a work area of the CPU 101, and stores, for example, a control program executed by the CPU 101.

An external memory control unit 112 is an interface connecting to a PC and other media (e.g., a hard disk, a memory card, a CF card, a SD card, and USB memory).

The image processing apparatus illustrated in FIG. 5 uses, as targets, captured image data transmitted from the image capturing unit 102, or image data accumulated in the internal memory 111 and the external memory 113, and extracts a subject under the control of the CPU 101 in the image capturing apparatus illustrated in FIG. 6. The image processing result of the image processing apparatus illustrated in FIG. 5 is encoded in the compression/decompression unit 110, stored in the internal memory 111 or the external memory 113 in the image capturing apparatus illustrated in FIG. 6, or used for other image processing.

Flow of Image Processing

Figure 7:
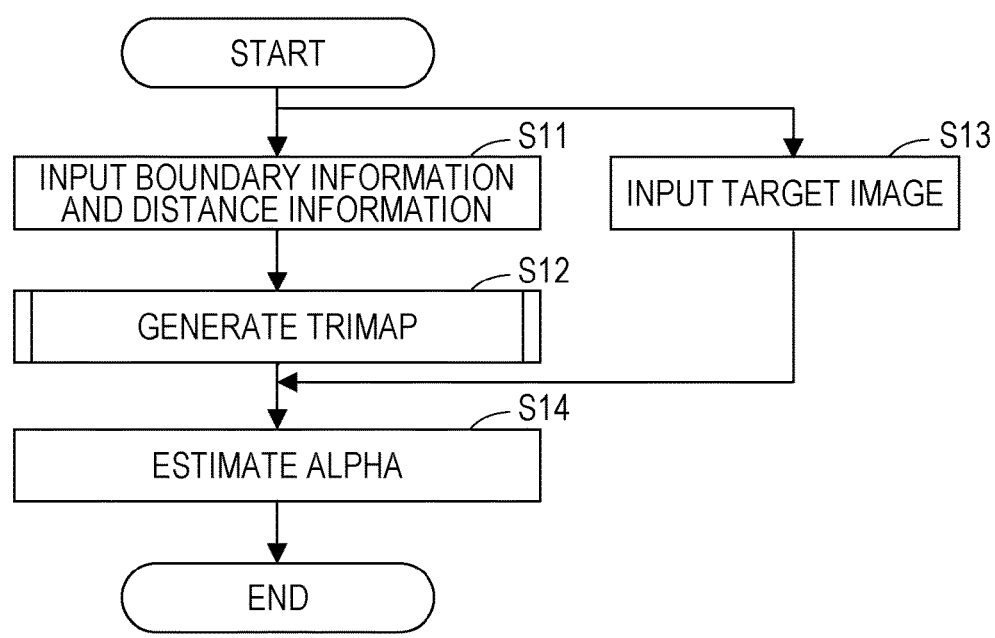
FIG. 7 is a flowchart illustrating an image processing method according to the first embodiment.

FIG. 7 is a flowchart illustrating a process of acquiring an extraction result of a subject from an input image in the image processing apparatus illustrated in FIG. 5 according to the present embodiment.

First, in step S11, boundary information and distance information of a target image are input. The boundary information indicates a boundary between the target area and the rest of the areas; that is, a boundary of binary information between a foreground area and a background area. The distance information is a distance value indicating a distance between an object corresponding to each pixel in the target image and the image capturing apparatus that is used as a reference position, or information indicating distance reliability.

Next, in step S12, the trimap generation unit 11 refers to the boundary information and the distance information, and generates a ternary trimap that consists of a defined foreground area, a defined background area, and an undefined area. In this trimap generation process, regarding each boundary pixel existing between the foreground area and the background area, a width of the undefined area of the trimap is determined with reference to the distance information of pixels existing on the periphery of the boundary pixel (hereafter, referred to also as "peripheral pixels"). Details of the trimap generation process are described later with reference to FIG. 8.

Next, in step S13, the target image, i.e., a color image, is input.

Next, in step S14, in the undefined area in the trimap generated in step S12, the alpha estimation unit 12 estimates a foreground color and a background color that constitute the undefined area in accordance with the color information of each pixel and estimates alpha. Details of the alpha estimation process are described later.

Step S12: Trimap Generation Process

Figure 8:
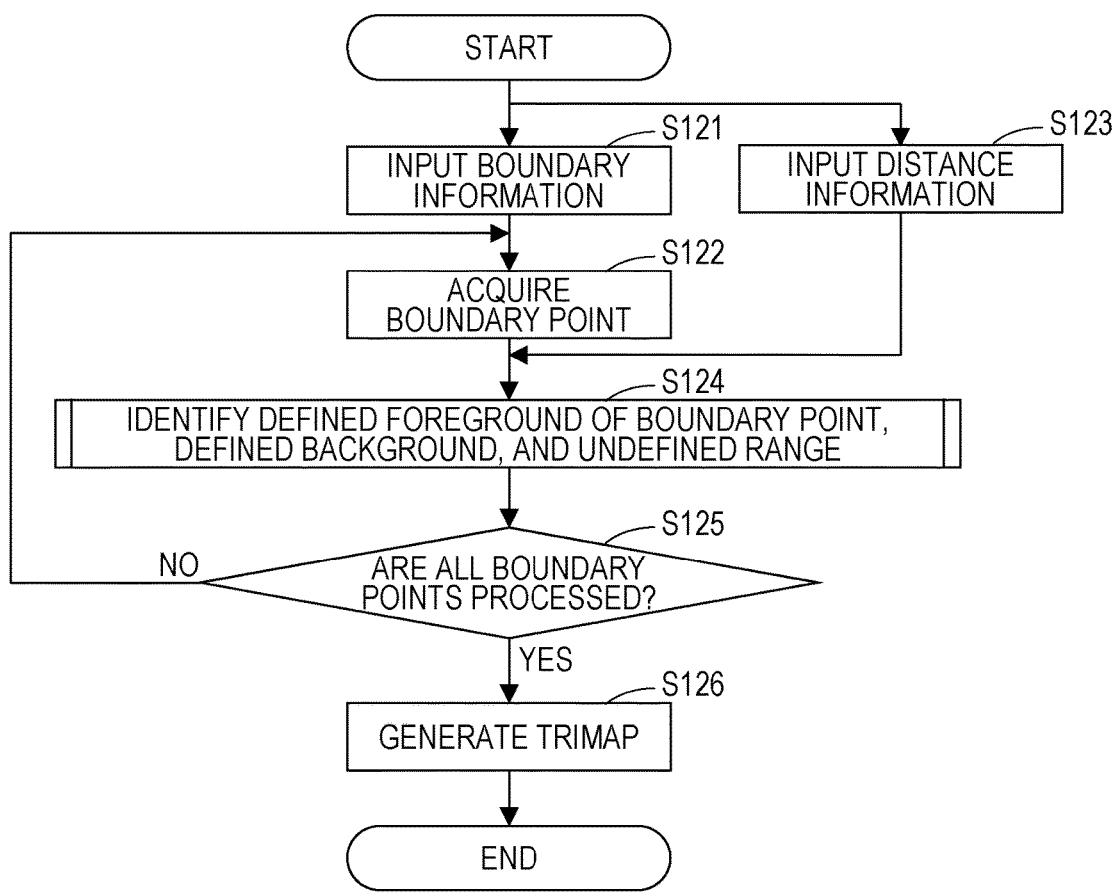
FIG. 8 is a flowchart illustrating a trimap generation process in the first embodiment.

Details of the trimap generation process in the first embodiment are described with reference to FIG. 8.

First, the boundary information is input in step S121.

Next, in step S122, a boundary point used as a process target is acquired.

Next, in step S123, a range image is input. Here, a portion for which distance estimation is not completed is illustrated by black color and a distance value thereof is small.

Next, in step S124, an undefined range is identified with reference to feature quantities (i.e., the distance information) of the peripheral pixels at the boundary point used as the process target. Details of the identification process in the undefined range of the boundary point are described with reference to FIG. 9.

Next, in step S125, whether all the boundary points have been processed is determined. If there still is an unprocessed boundary point, the processes from step S122 to step S124 are repeated. If there is no unprocessed boundary point left, in step S126, a trimap image is generated based on the information about the undefined range of all the boundary points.

Step S124: Identification Process of Undefined Range of Boundary Point

Figure 9:
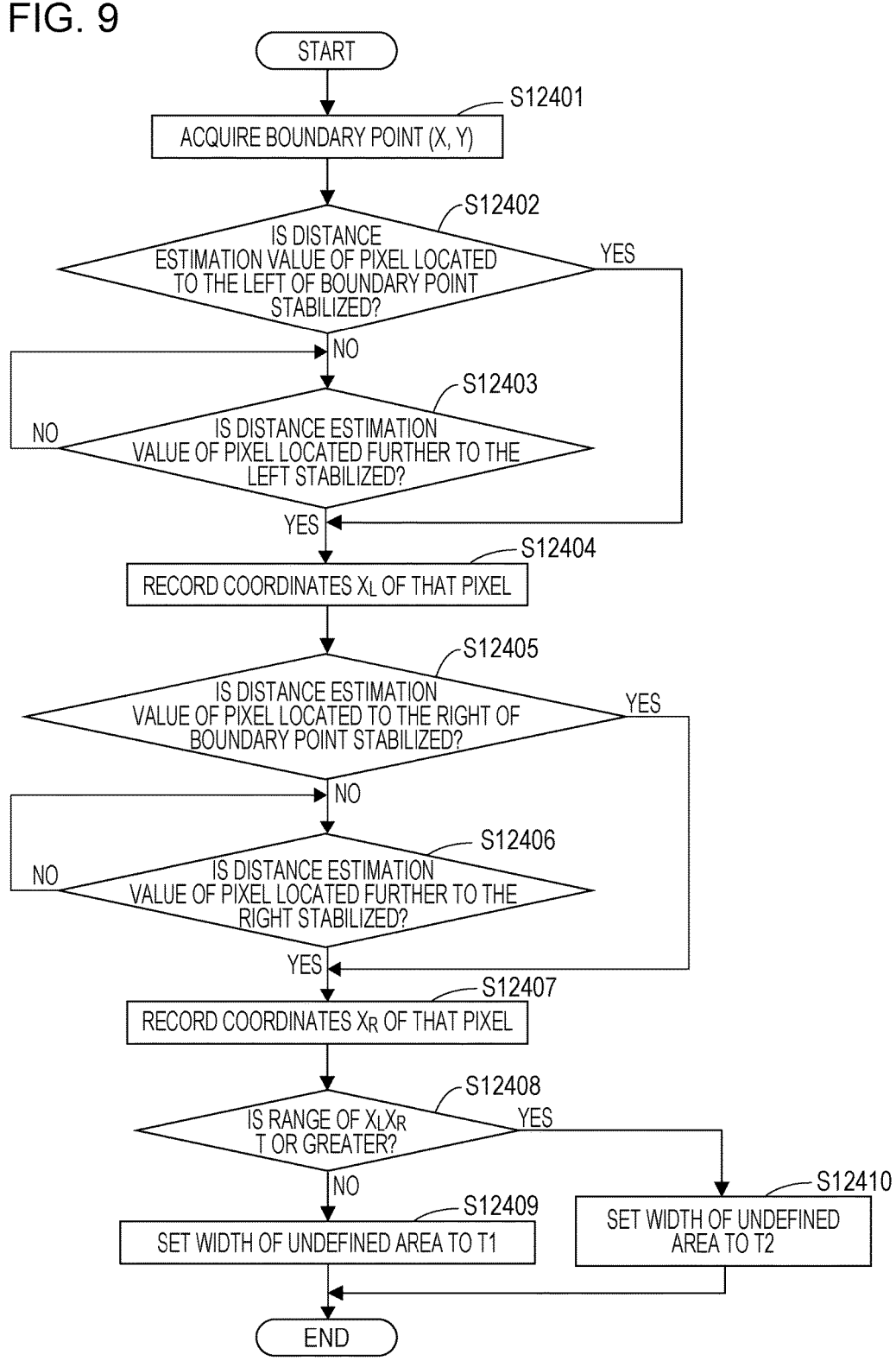
FIG. 9 is a flowchart illustrating an identification process of an undefined range of a boundary point in the first embodiment.

Details of the identification process of the undefined range of the boundary point in the first embodiment are described with reference to FIG. 9.

First, in step S12401, coordinate information (X, Y) of the boundary point used as a process target is acquired.

Next, in from step S12402 to step S12410, the width of the undefined range is controlled based on the distance values of the peripheral pixels of the boundary point.

In step S12402, regarding the pixel located to the left of the boundary point used as the process target, it is determined whether distance estimation of that pixel is undefined. If the distance value of the pixel is smaller than a threshold, it is determined that distance estimation of that pixel is undefined (i.e., the pixel is an unstable pixel), and the process proceeds to step S12403. If the distance value of the pixel is not smaller than the threshold, the process proceeds to step S12404.

In step S12403, regarding a pixel located further to the left of the pixel of which distance estimation has been determined to be undefined (i.e., the pixel is unstable), the same determination process as that of step S12402 is repeated. If the distance value of the pixel of determination target is not smaller than a threshold, it is determined that the distance value of that pixel is not undefined (i.e., the pixel is stable) and the process proceeds to step S12404.

In step S12404, coordinates $(X_L, Y)$ of the pixel of which distance estimation has been determined not to be undefined are recorded.

Similarly, a pixel located to the right of the boundary point is focused on.

In step S12405, regarding the pixel located to the right of the boundary point used as the process target, it is determined whether distance estimation of that pixel is undefined. If the distance value of the pixel is smaller than a threshold, it is determined that distance estimation of that pixel is undefined, and the process proceeds to step S12406. If the distance value of the pixel is not smaller than the threshold, the process proceeds to step S12407.

In step S12406, the same determination process as that of step S12405 is repeated regarding the pixel located further to the right of the pixel that has been determined to be undefined. If the distance value of the pixel of determination target is not smaller than a threshold, it is determined that the distance value of that pixel is not undefined and the process proceeds to step S12407.

In step S12407, coordinates $(X_R, Y)$ of the pixel of which distance estimation has been determined not to be undefined are recorded.

In step S12408, whether an absolute value of a difference between two X coordinates (i.e., $|X_L-X_R|$) is equal to or greater than a threshold T. If $|X_L-X_R|$ is smaller than T, the width of the undefined area is set to T1 in step S12409. If $|X_L-X_R|$ is equal to or greater than T, the width of the undefined area is set to T2 in step S12410. Here, T1<T2.

Example of Identification Process of Undefined Range of Boundary Point

Figure 10:
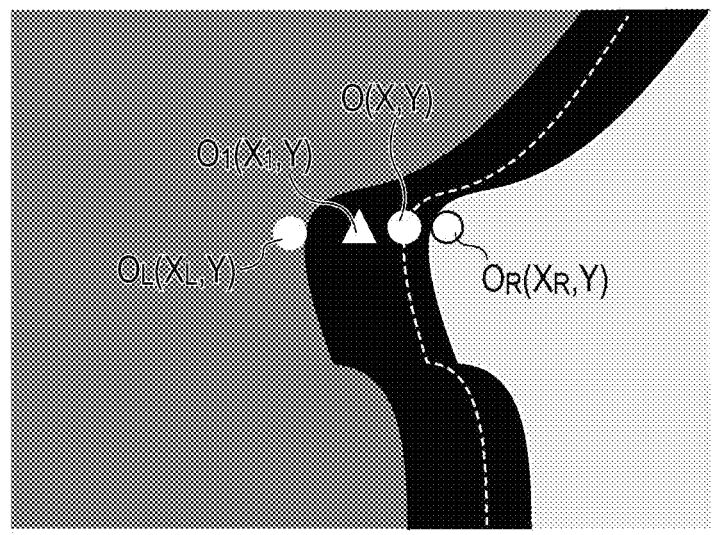
FIG. 10 illustrates an example of an identification process of an undefined range of a boundary point in the first embodiment.

FIG. 10 illustrates an example of the identification process of the undefined range of the boundary point in the first embodiment.

Here, the boundary point as the process target is expressed by O(X, Y). A process based on the distance information of the pixels located to the left and the right of the boundary point is performed to determine the undefined range of the boundary point. A pixel $O_1(X_1, Y)$ represented as a triangle located to the left of the boundary is a pixel of which distance estimation is difficult. A pixel $O_L(X_L, Y)$ represented as a circle located to the left of the triangle is a pixel of which distance estimation is completed. Similarly, a pixel $O_R(X_R, Y)$ represented as a circle located to the right of the triangle is a pixel of which distance estimation is completed. The width of the undefined area is controlled based on the value of $|X_L-X_R|$.

Example of Trimap Generation

Figure 11:
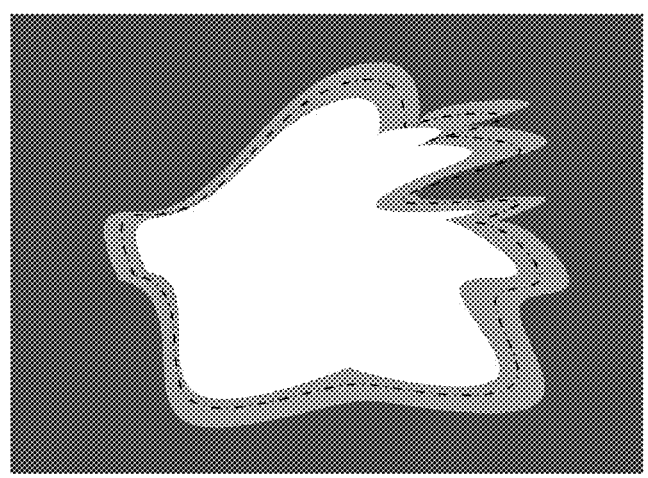
FIG. 11 illustrates an example of a trimap generation process of an example of an image illustrated in FIG. 3A in the first embodiment.

FIG. 11 illustrates an example of a trimap generation process of an example of an input image illustrated in FIG. 3A in the first embodiment.

Here, the defined background area is illustrated by black color, the defined foreground area is illustrated by white color, the undefined area is illustrated by gray color, and a contour of an actual object is illustrated by a dotted line by reference. As described in this example, in the trimap generation of the present embodiment, the width of a portion on the periphery of the object in which fine expression is considered to be necessary is determined to be thick as the undefined area and the width of a portion on the periphery of the object in which fine expression is considered not to be necessary is determined to be narrow. In this manner, a trimap in which the area near the true boundary is correctly included in the undefined area may be generated and, therefore, alpha estimation may be performed more precisely.

Step S14: Alpha Estimation Process

In the alpha estimation process, the following Expression is temporarily held on condition that an input image I is generated by a linear mixture of a foreground color F and a background color B:

$$I(x)=\alpha(x)F(x)+(1-\alpha(x))B(x).$$

Here, x denotes the coordinates of the pixel on the image and $\alpha(x)$ denotes alpha of the pixel. The alpha estimation process may be implemented by a publicly known method.

In the above embodiment, whether distance estimation of the peripheral pixels located to the left and the right of each boundary point on the boundary has not been completed is determined, and the width of the undefined area is determined. Instead of the peripheral pixels located to the left and the right of each boundary point on the boundary, regarding peripheral pixels located upside and downside of each boundary point on the boundary, peripheral pixels located upside, downside, to the left and the right of each boundary point on the boundary, or peripheral pixels that exist on the normal line of the boundary line, whether distance estimation has not been completed may be determined, and the width of the undefined area may be controlled.

In the above embodiment, in each boundary point located on the boundary between the foreground area and the background area, whether distance estimation is completed is determined depending on whether the distance between the peripheral pixels (e.g., above $|X_L-X_R|$) is equal to or greater than a predetermined value. The width of the undefined area is controlled based on the range between the pixels for which distance estimation is not completed. Whether distance estimation is completed may be determined depending on whether the distance value of the peripheral pixel is within a certain range.

In the above embodiment, in each boundary point on the boundary between the foreground area and the background area, the width of the undefined area is determined in two stages depending on whether the range between the pixels for which distance estimation of the peripheral pixels is not completed is equal to or greater than a predetermined threshold. Alternatively, the range between the pixels for which distance estimation of the peripheral pixels is not completed may be divided into several stages, and the width of the undefined area may be set in several stages or continuously.

Second Embodiment

In the first embodiment, in each boundary point on the boundary between the target area and the rest of the areas, whether distance estimation of the peripheral pixels has not been completed is determined, and the width of the undefined area is determined. In the present embodiment, the width of the undefined area is determined based on distance reliability of peripheral pixels in each boundary point.

Step S124: Identification Process of Undefined Range of Boundary Point

Figure 12:
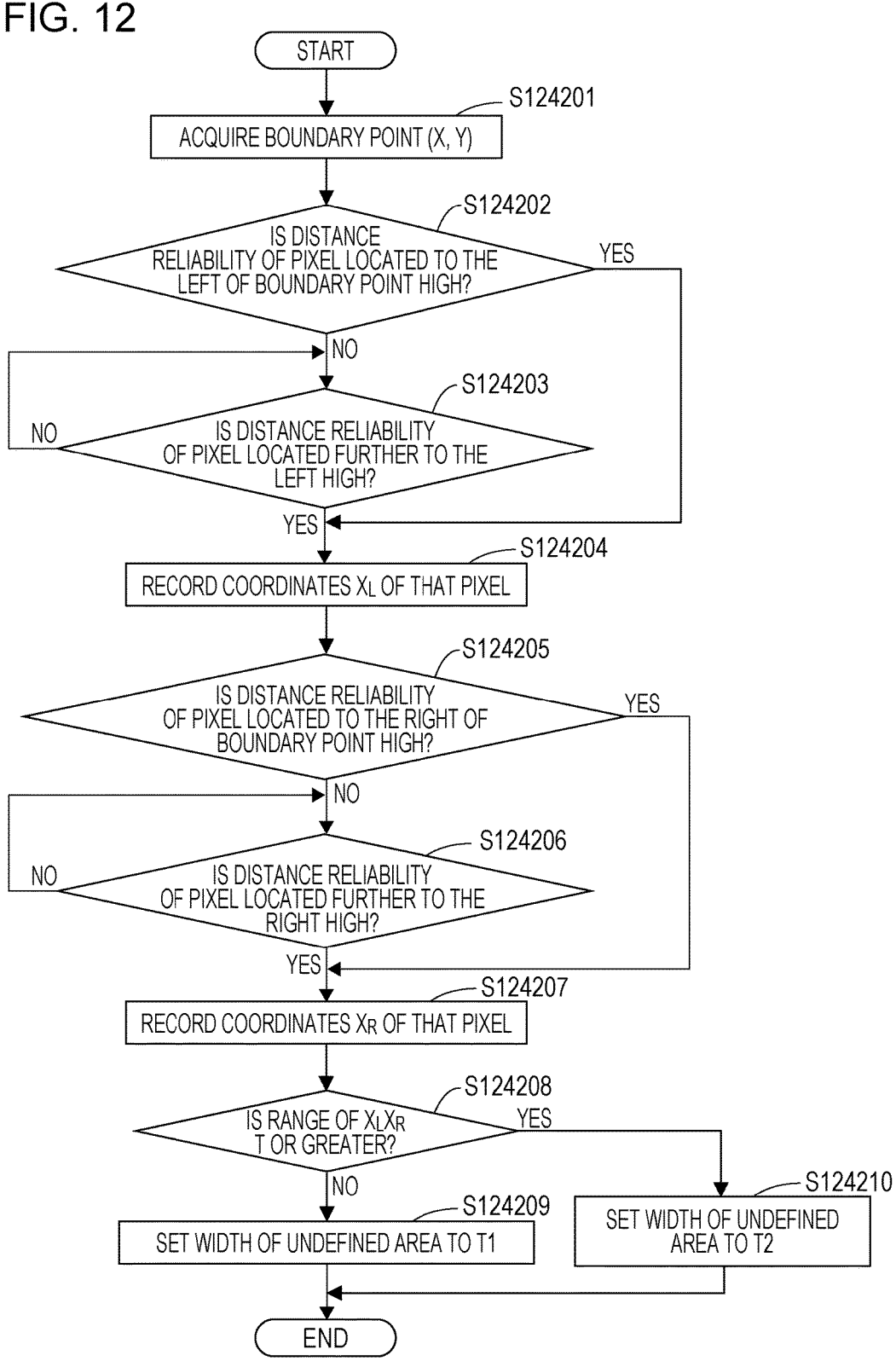
FIG. 12 is a flowchart illustrating an identification process of an undefined range of a boundary point in a second embodiment.

Details of the identification process of the undefined range of the boundary point in a second embodiment are described with reference to FIG. 12.

First, in step S124201, coordinate information (X, Y) of the boundary point used as a process target is acquired. Next, in from step S124202 to step S124210, the width of the undefined range is determined based on the distance reliability of the peripheral pixels of that boundary point.

In step S124202, regarding the pixel located to the left of the boundary point used as the process target, it is determined whether distance estimation reliability of that pixel is high. If distance estimation reliability of the pixel is not higher than a threshold, it is determined that distance estimation of that pixel is not reliable and the process proceeds to step S124203. If distance estimation reliability of the pixel is higher than a threshold, the process proceeds to step S124204.

In step S124203, the same determination process as that of step S124202 is repeated regarding the pixel located to the left of the pixel of which distance estimation reliability has been determined not to be higher than a threshold. If distance reliability of the pixel which is the target of determination is higher than a threshold, it is determined that distance estimation of that pixel is reliable and the process proceeds to step S124204.

In step S124204, coordinates $(X_L, Y)$ of the pixel acquired on the left of the above boundary point are recorded.

Similarly, a pixel located to the right of the boundary point is focused on.

In step S124205, regarding the pixel located to the right of the boundary point used as the process target, it is determined whether distance estimation reliability of that pixel is higher than a threshold. If distance estimation reliability of the pixel is not higher than a threshold, it is determined that distance estimation of that pixel is not reliable, and the process proceeds to step S124206. If reliability is higher than a threshold, the process proceeds to step S124207.

In step S124206, the same determination process as that of step S124205 is repeated regarding the pixel located to the right of the pixel of which distance estimation reliability has been determined not to be higher than a threshold. If distance reliability of the pixel which is the target of determination is higher than a threshold, it is determined that distance estimation of that pixel is reliable and the process proceeds to step S124207.

In step S124207, coordinates $(X_R, Y)$ of the pixel of which distance reliability is determined to be higher than a threshold are recorded.

In step S124208, whether an absolute value of a difference between two X coordinates (i.e., $|X_L-X_R|$) is equal to or greater than a threshold T. If $|X_L-X_R|$ is smaller than T, the width of the undefined area is set to T1 in step S124209. If $|X_L-X_R|$ is equal to or greater than T, the width of the undefined area is set to T2 in step S124210. Here, T1<T2.

In the second embodiment, in each boundary point, whether distance estimation reliability of peripheral pixels is high is determined, and the width of the undefined area is determined.

Third Embodiment

In the first and the second embodiments, the width of the undefined area is determined based on distance information of the peripheral pixel in the boundary point on the boundary between the target area and the rest of the areas. In the present embodiment, the width of the undefined area is determined based on the variance of the edge directions of peripheral pixels in each boundary point.

The "edge" herein is a portion at which brightness in an image changes sharply. Edge may be detected using, for example, an edge detection operator, such as Sobel, Prewitt, and Laplacian. Regarding each pixel, the edge detection operator is applied in the horizontal and vertical directions of the image. Edge intensity and the edge direction are calculated based on output values. If the output value of the edge detection operator in the horizontal direction is denoted by fx and the output value in the vertical direction is denoted by fy, edge intensity I and an edge direction Φ may be calculated using, for example, with following Expressions:

$$I=(fx^2+fy^2)^{(1/2)}$$

$$\phi 32 \arctan(fy/fx).$$

Figure 13:
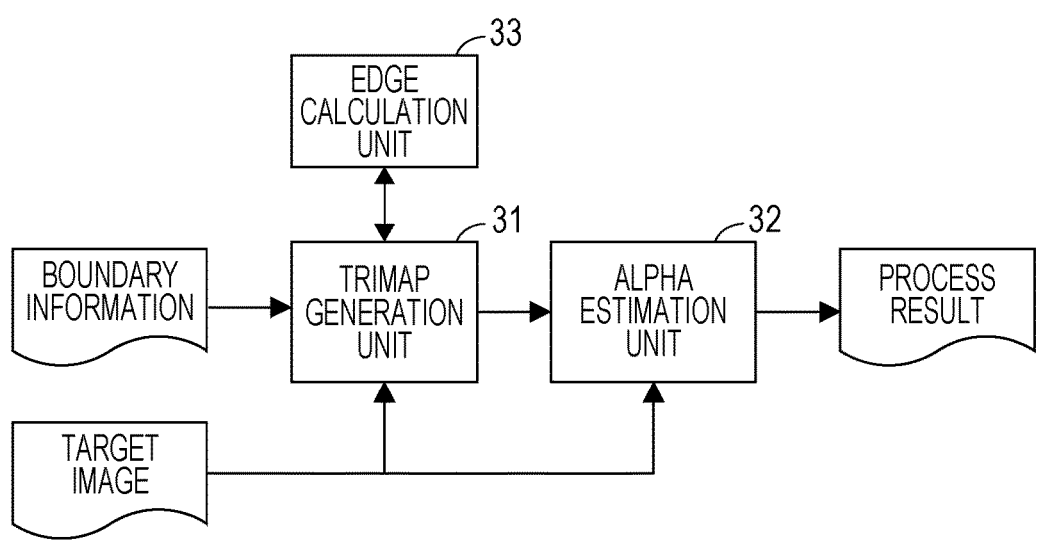
FIG. 13 is a block diagram illustrating a functional configuration of an image processing apparatus according to a third embodiment.

FIG. 13 is a block diagram illustrating a configuration of an image processing apparatus according to an embodiment of the present invention.

Configuration of Image Processing Apparatus

The image processing apparatus is provided with a trimap generation unit 31, an alpha estimation unit 32, and an edge calculation unit 33.

The trimap generation unit 31 uses boundary information and target image as input, and generates a ternary trimap image that consists of a defined foreground area, a defined background area, and an undefined area. Here, the boundary information relates to a boundary between a target area and the rest of the areas. The boundary information may also be a binary image of the foreground area and the background area of the target image, a boundary line, or may be a list of boundary points.

The alpha estimation unit 32 estimates alpha using color information of each pixel, and extracts a subject in the undefined area in the ternary trimap generated by the trimap generation unit 31. The edge calculation unit 33 calculates edge directions and a variance of the edge directions of peripheral pixels of each point on the boundary.

Figure 14:
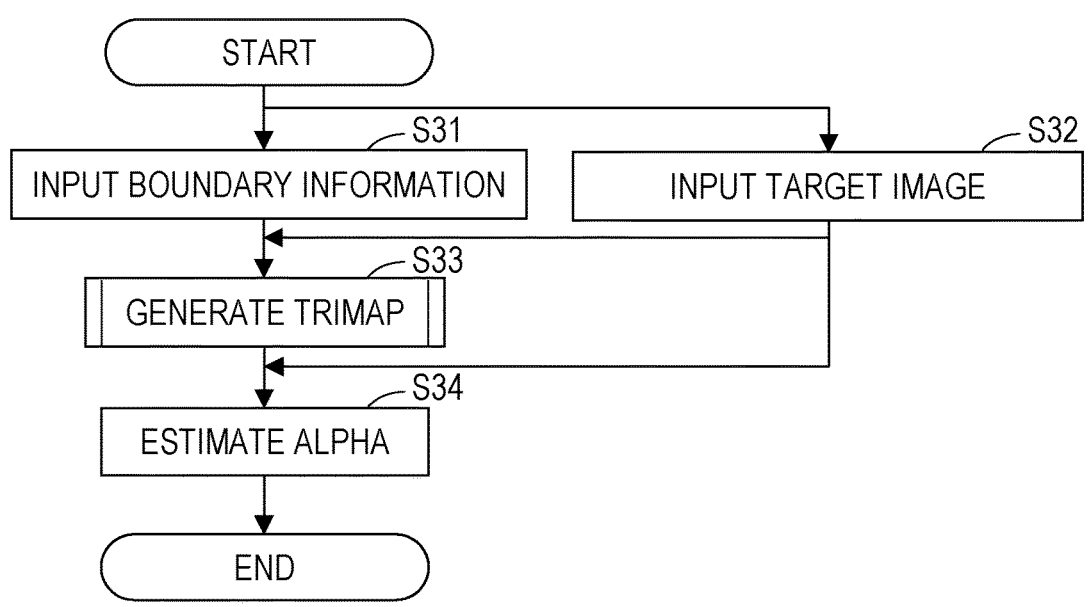
FIG. 14 is a flowchart illustrating an image processing method according to the third embodiment.

FIG. 14 is a flowchart illustrating a process of acquiring an extraction result of a subject from an input image in the image processing apparatus illustrated in FIG. 13 according to the present embodiment.

First, in step S31, boundary information of the target image is input.

Next, in step S32, the target image is input.

Next, in step S33, a ternary trimap that consists of a defined foreground area, a defined background area, and an undefined area is generated with reference to the boundary information and the target image. In this trimap generation process, regarding each boundary pixel existing between the foreground area and the background area, a width of the undefined area of the trimap is determined with reference to the edge direction of the peripheral pixels. Details of this trimap generation process are described later with reference to FIG. 15.

Next, in step S34, in the undefined area in the trimap generated in step S33, the alpha estimation unit 32 estimates a foreground color and a background color that constitute the undefined area in accordance with the color information of each pixel and estimates alpha.

Step S33: Trimap Generation Process

Figure 15:
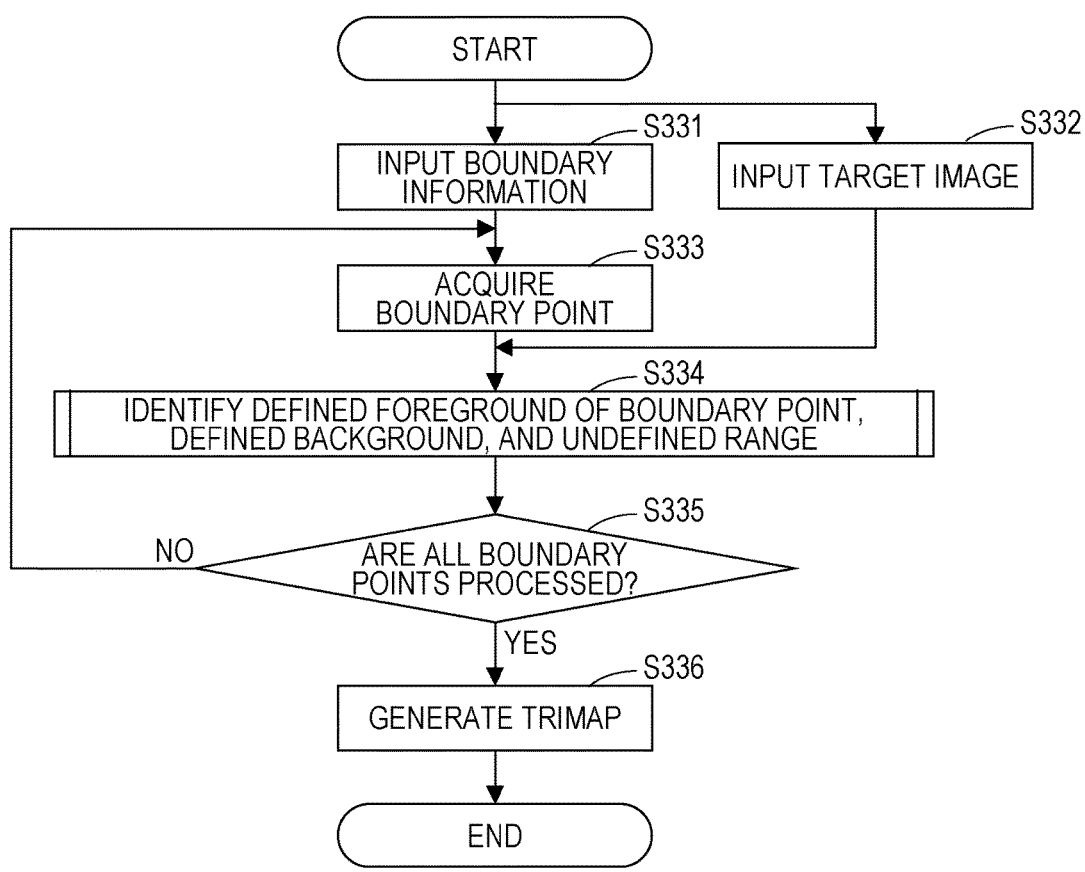
FIG. 15 is a flowchart illustrating a trimap generation process in the third embodiment.

Details of the trimap generation process in the third embodiment are described with reference to FIG. 15.

First, in step S331, the boundary information is input.

Next, in step S332, the target image is input.

Next, in step S333, a boundary point is acquired.

Next, in step S334, an undefined range is identified with reference to the edge direction acquired based on color information of the peripheral pixels at the boundary point used as the process target. Details of the identification process in the undefined range of the boundary point are described with reference to FIG. 16.

Next, in step S335, whether all the boundary points have been processed is determined. If there still is an unprocessed boundary point, the process of step S334 is repeated. If there is no unprocessed boundary point left, in step S336, a trimap image is generated based on the information about the undefined range of all the boundary points.

Step S334: Identification Process of Undefined Range of Boundary Point

Figure 16:
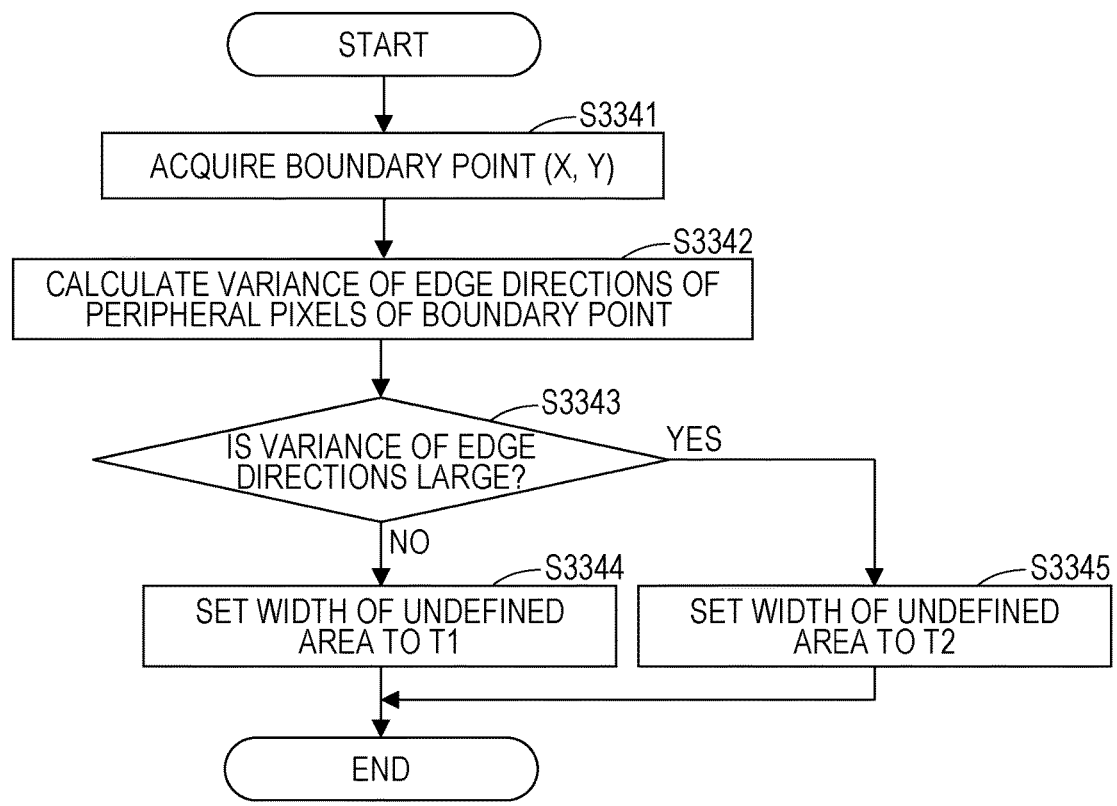
FIG. 16 is a flowchart illustrating an identification process of an undefined range of a boundary point in the third embodiment.

Details of the identification process of the undefined range of the boundary point in a third embodiment are described with reference to FIG. 16.

First, in step S3341, coordinate information (X, Y) of the boundary point used as a process target is acquired.

Next, in from step S3342 to step S3345, based on the width of the undefined range is determined a variance of edge directions of the peripheral pixels of the boundary point.

In step S3342, an edge of the peripheral pixels of the boundary point used as the process target is taken, an edge direction is calculated, and a variance of edge directions is obtained.

In step S3343, whether a variance of edge directions is greater than a predetermined value is determined. If edge direction distribution is equal to or smaller than the predetermined value, in step S3344, an area near the boundary point is defined as an area in which the edge directions are uniform and the width of the undefined area is set to T1. If a variance of edge directions is greater than the predetermined value, in step S3345, the area near the boundary point is defined as an area in which the edge directions are not uniform and the width of the undefined area is set to T2. Here, T1<T2.

Example of Identification Process of Undefined Range of Boundary Point

Figure 17:
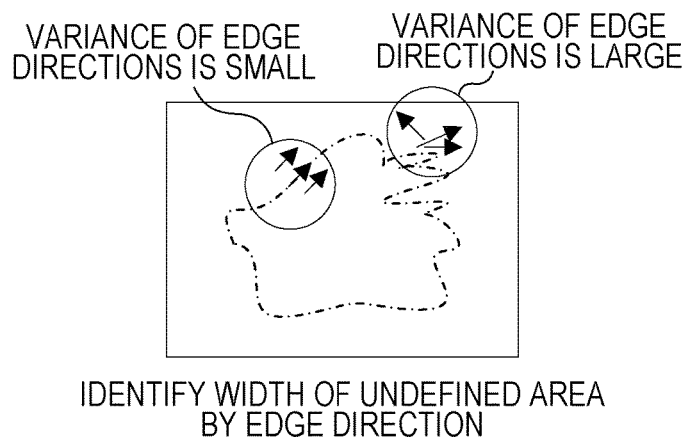
FIG. 17 illustrates an example of an identification process of an undefined range of a boundary point in the third embodiment.

FIG. 17 illustrates an example of the identification process of the undefined range of the boundary point in the third embodiment.

In the present embodiment, the width of the undefined area is determined based on the variance of the edge directions of the peripheral pixels in each boundary point on the boundary. Alternatively, other indices with which statistics of edge directivity are obtained may be used.

In the present embodiment, the width of the undefined area is controlled in two stages based on edge direction distribution of the peripheral pixels in each boundary point on the boundary. Alternatively, the width of the undefined area may be controlled by weighting the distribution.

Fourth Embodiment

In the first and the second embodiments, the width of the undefined area is determined based on distance information of the peripheral pixel in the boundary point on the boundary between the target area and the rest of the areas. In the third embodiment, the width of the undefined area is determined based on edge directivity of the peripheral pixels at the boundary point on the boundary between the target area and the rest of the areas. In the present embodiment, the width of the undefined area is temporarily determined based on the distance information of the peripheral pixels at the boundary point, whether the temporarily determined width is appropriate based on the edge information is determined, the width is corrected depending on the determination result, and the width of the undefined area is determined.

Figure 18:
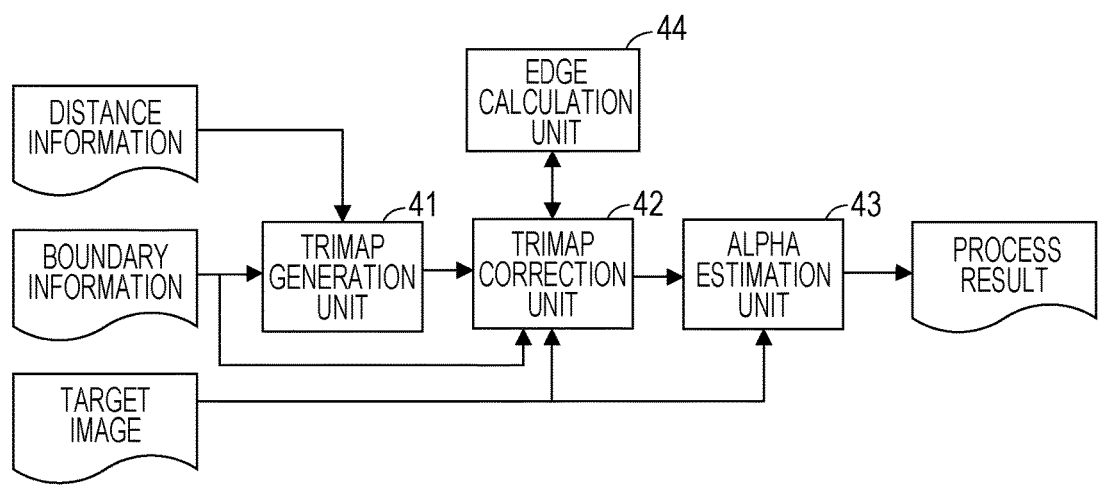
FIG. 18 is a block diagram illustrating a functional configuration of an image processing apparatus according to a fourth embodiment.

FIG. 18 is a block diagram illustrating a configuration of an image processing apparatus according to an embodiment of the present invention.

Configuration of Image Processing Apparatus

The image processing apparatus is provided with a trimap generation unit 41, a trimap correction unit (i.e., an undefined area correction unit) 42, and an alpha estimation unit 43.

The trimap generation unit 41 inputs boundary information and a target image, and generates a ternary trimap image that consists of a defined foreground area, a defined background area, and an undefined area.

The trimap correction unit (i.e., the undefined area correction unit) 42 determines whether noise, i.e., a setting error, exists in the trimap generated by the trimap generation unit 41 and, if noise exists, corrects the width of the undefined area.

The alpha estimation unit 43 estimates alpha using color information of each pixel, and extracts a subject in the undefined area in the ternary trimap generated by the trimap generation unit 42.

Figure 19:
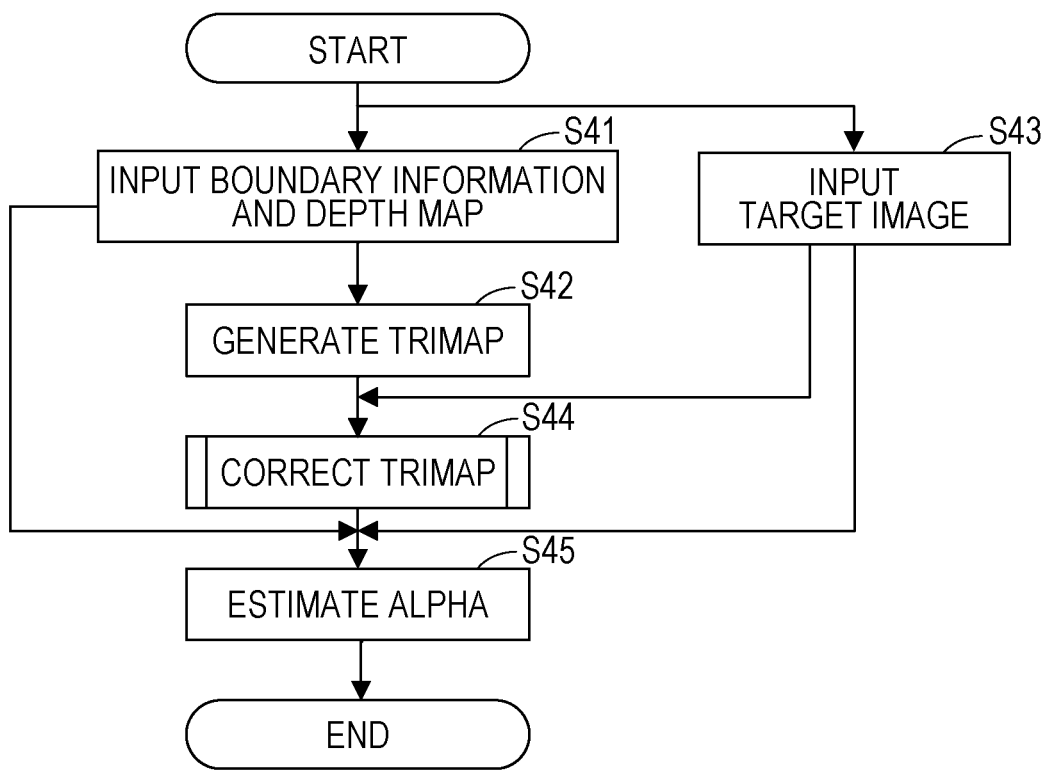
FIG. 19 is a flowchart illustrating an image processing method according to the fourth embodiment.

FIG. 19 is a flowchart illustrating a process of acquiring an extraction result of the subject from the input image in the image processing apparatus illustrated in FIG. 18 according to the present embodiment.

First, in step S41, boundary information and distance information of the target image are input.

Next, in step S42, a ternary trimap that consists of a defined foreground area, a defined background area, and an undefined area is generated with reference to the boundary information and the target image. This trimap generation process is the same as that of the first and the second embodiments.

Next, in step S43, the target image is input.

Next, in step S44, edge extraction is performed based on color information of the peripheral pixels of the boundary point, an edge direction and a variance of edge directions are calculated, whether noise exists in the undefined area is determined based on the edge direction distribution, and the trimap is corrected. Details of the trimap generation process are described with reference to FIG. 20.

Next, in step S45, in the undefined area in the trimap generated in step S44, the alpha estimation unit 43 estimates a foreground color and a background color that constitute the undefined area in accordance with the color information of each pixel and estimates alpha.

Step S44: Trimap Correction Process

Figure 20:
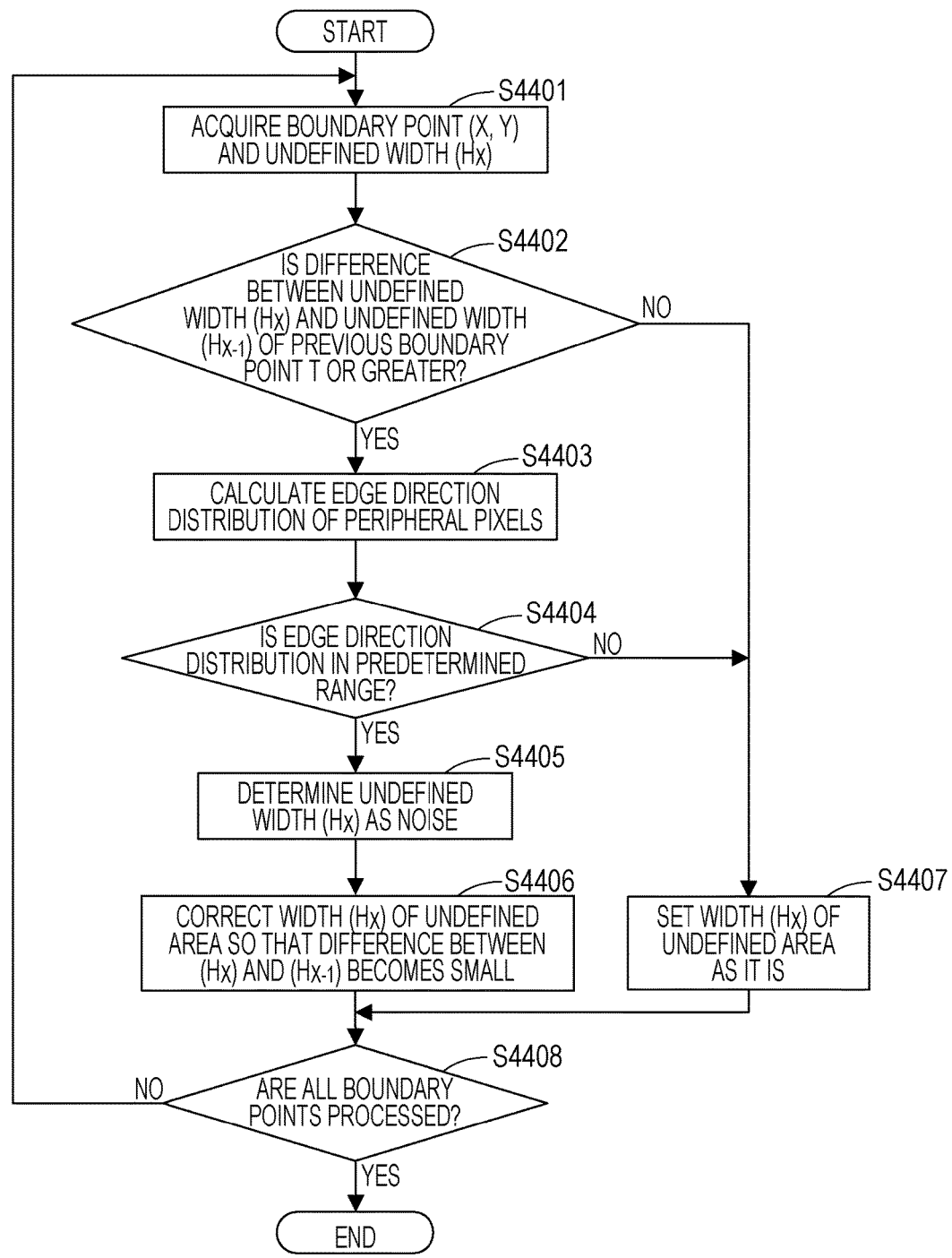
FIG. 20 is a flowchart illustrating a trimap correction process in the fourth embodiment.

Details of the trimap correction process in the fourth embodiment are described with reference to FIG. 20.

First, in step S4401, coordinates (X, Y) of the boundary point used as a process target, and a width ($H_X$) of the undefined area of the boundary point are acquired.

Next, in step S4402, the width ($H_X$) of the undefined area of the boundary point and a previously processed width of an undefined area of a boundary point (which is denoted by ($H_{X-}$)) are compared. If a difference between the widths of the undefined areas is equal to or greater than a certain threshold T, in from step S4403 to step S4405, it is determined whether the width ($H_X$) of the undefined area is noise.

In step S4403, a variance of edge directions of pixels located on the periphery of the boundary point is calculated.

In step S4404, if the variance of the edge directions falls within a predetermined range (i.e., equal to or smaller than a threshold), the process proceeds to step S4405. In step S4405, it is determined that the width ($H_X$) of the undefined area is noise, and the process proceeds to step S4406. In step S4406, the width ($H_X$) of the undefined area is adjusted so that the difference between ($H_X$) and ($H_{X-}$) becomes small. If the variance of the edge directions is out of the predetermined range, in step S4407, the width ($H_X$) of the undefined area of the boundary point is remained as it is.

The case in which "the difference between the widths ($H_X$) and ($H_{X-}$) of the undefined areas is large" may be, for example, a case in which "the width ($H_X$) of the undefined area is large while the width ($H_{X-}$) of the undefined area is small." The case in which "the width ($H_X$) of the undefined area is small while the width ($H_{X-}$) of the undefined area is large" is also included.

In such a case, it is considered that edge direction distribution of the peripheral pixels of a boundary point X usually exceeds a predetermined range (i.e., greater than a threshold).

That is, in a case in which edge direction distribution of the peripheral pixels of the boundary point X is smaller regardless of the fact that "the difference between the widths ($H_X$) and ($H_{X-}$) of the undefined areas is large" (equal to or smaller than a threshold), it is highly possible that "the width ($H_X$) of the undefined area" is noise.

"Adjusting the width ($H_X$) of the undefined area so that the difference between ($H_X$) and ($H_{X-}$) becomes small" includes, for example, "changing the width ($H_X$) of the undefined area to a value equal to ($H_{X-}$)."

In step S4408, whether processes have been completed at all the boundary points is determined. If there still is an unprocessed boundary point, the process returns to step S4401 and the processes from step S4401 to step S4407 are repeated. If there is no unprocessed boundary point left, the correction process is completed. Example of Trimap Correction Process FIGS. 21A and 21B illustrate an example of a trimap correction process in the fourth embodiment.

FIG. 21A illustrates a part of an image of hair, and FIG. 21B illustrates an example of a trimap of the image of FIG. 21A. In accordance with the condition of the hair, a part of the undefined area protrudes from the undefined area.

In the fourth embodiment, a trimap is generated based on the boundary information and the distance information, and accuracy of the trimap generated based on the edge information of the peripheral pixels of the boundary is increased.

According to the above embodiment, the width of the undefined area is controlled in based on the feature of the boundary area of the object in the input image, the trimap in which an area near the true boundary is included in the undefined area is generated, and alpha is estimated. Therefore, alpha estimation of the undefined area can be performed effectively and efficiently, and a subject area can be extracted correctly.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-014955, filed Jan. 29, 2014 which is hereby incorporated by reference herein in its entirety.

What is claimed is:

1. An image processing apparatus comprising:
a memory for storing a program;
a processor for executing the program stored in the memory to function as:
an acquisition unit configured to acquire a boundary between a target area and a non-target area from an image and distances between respective pixels in the image and a reference position;
a determination unit configured to determine a width of an undefined area at each boundary point of a plurality of boundary points in the acquired boundary based on distribution of status values of distances for peripheral pixels of the boundary point;
a setting unit configured to set the undefined area for which the width is determined at each boundary point of the plurality of boundary points, on the periphery of the boundary; and
a generating unit configured to define an area excluding the undefined area from the target area as the foreground area, define an area excluding the undefined area from the non-target area as the background area, and generate area information that specifies the foreground area, the background area, and the undefined area.

2. The image processing apparatus according to claim 1, wherein the acquisition unit acquires the boundary by acquiring binary information that indicates whether each pixel exists in the target area or in the non-target area.

3. The image processing apparatus according to claim 1, wherein the status values of distances are estimated values of distances between respective peripheral pixels of the boundary point and the reference position.

4. The image processing apparatus according to claim 1, wherein the status values of distances are reliabilities of distances between respective peripheral pixels of the boundary point and the reference position.

5. An image processing apparatus comprising:
a memory for storing a program;
a processor for executing the program stored in the memory to function as:
an acquisition unit configured to acquire a boundary between a target area and a non-target area from an image;
a calculation unit configured to calculate edge directions of peripheral pixels of each boundary point of a plurality of boundary points on the boundary and a variance of the edge directions;
a determination unit configured to determine a width of an undefined area at each boundary point of the plurality of boundary points based on distribution of the variance of the edge directions of the peripheral pixels of the boundary point;
a setting unit configured to set the undefined area for which the width is determined at each boundary point, on the periphery of the boundary; and
a generating unit configured to define an area excluding the undefined area from the target area as the foreground area, define an area excluding the undefined area from the non-target area as the background area, and generate area information that specifies the foreground area, the background area, and the undefined area.

6. An image processing apparatus:
a memory for storing a program;
a processor for executing the program stored in the memory to function as:
an acquisition unit configured to acquire a boundary between a target area and a non-target area from an image;
a setting unit configured to set an undefined area on the periphery of the boundary in a width based on feature quantities of peripheral pixels of the boundary;
a generating unit configured to define an area excluding the undefined area from the target area as the foreground area, define an area excluding the undefined area from the non-target area as the background area, and generate area information that specifies the foreground area, the background area, and the undefined area;
an edge calculation unit configured to calculate edge directions of the peripheral pixels of each point on the boundary and a variance of the edge directions; and
a correction unit configured to calculate a difference between a width of an undefined area of a first boundary point and a width of an undefined area of a second boundary point, wherein
in a case in which the difference is equal to or greater than a first threshold, the correction unit compares a variance of edge directions of the peripheral pixels at the first boundary point with a second threshold and,
in a case in which the variance of the edge directions of the peripheral pixels at the first boundary point is equal to or smaller than the second threshold, the correction unit changes the width of the undefined area at the first boundary point so that the difference is reduced.

7. The image processing apparatus according to claim 6, wherein in a case in which the difference is not equal to or greater than the first threshold, or in a case in which the variance of the edge directions of the peripheral pixels at the first boundary point is not equal to or smaller than the second threshold, the correction unit keeps the width of the undefined area at the first boundary point as it is.

8. An image processing method, comprising:
acquiring a boundary between a target area and a non-target area from an image and distances between respective pixels in the image and a reference position;
determining a width of an undefined area at each boundary point of a plurality of boundary points in the acquired boundary based on distribution of status values of distances for peripheral pixels of the boundary point;
setting the undefined area for which the width is determined at each boundary point of the plurality of boundary points, on the periphery of the boundary; and
defining an area excluding the undefined area from the target area as the foreground area, defining an area excluding the undefined area from the non-target area as the background area, and generating area information that specifies the foreground area, the background area, and the undefined area.

9. A non-transitory computer readable storage medium in which an image processing program for making a computer execute an image processing method, comprising:
acquiring a boundary between a target area and a non-target area from an image and distances between respective pixels in the image and a reference position;
determining a width of an undefined area at each boundary point of a plurality of boundary points in the acquired boundary based on distribution of status values of distances for peripheral pixels of the boundary point;
setting the undefined area for which the width is determined at each boundary point of the plurality of boundary points, on the periphery of the boundary; and
defining an area excluding the undefined area from the target area as the foreground area, defining an area excluding the undefined area from the non-target area as the background area, and generating area information that specifies the foreground area, the background area, and the undefined area.

10. An image processing method comprising:
acquiring a boundary between a target area and a non-target area from an image;
setting an undefined area on the periphery of the boundary in a width based on feature quantities of peripheral pixels of the boundary;
defining an area excluding the undefined area from the target area as the foreground area, defining an area excluding the undefined area from the non-target area as the background area, and generating area information that specifies the foreground area, the background area, and the undefined area;
calculating edge directions of the peripheral pixels of each point on the boundary and a variance of the edge directions; and
calculating a difference between a width of an undefined area of a first boundary point and a width of an undefined area of a second boundary point,
wherein in a case in which the difference is equal to or greater than a first threshold, the correction unit compares a variance of edge directions of the peripheral pixels at the first boundary point with a second threshold and,
in a case in which the variance of the edge directions of the peripheral pixels at the first boundary point is equal to or smaller than the second threshold, the correction unit changes the width of the undefined area at the first boundary point so that the difference becomes small.

11. A non-transitory computer readable storage medium in which an image processing program for making a computer execute an image processing method comprising:
acquiring a boundary between a target area and a non-target area from an image;
setting an undefined area on the periphery of the boundary in a width based on feature quantities of peripheral pixels of the boundary;
defining an area excluding the undefined area from the target area as the foreground area, defining an area excluding the undefined area from the non-target area as the background area, and generating area information that specifies the foreground area, the background area, and the undefined area;
calculating edge directions of the peripheral pixels of each point on the boundary and a variance of the edge directions; and
calculating a difference between a width of an undefined area of a first boundary point and a width of an undefined area of a second boundary point, wherein in a case in which the difference is equal to or greater than a first threshold, the correction unit compares a variance of edge directions of the peripheral pixels at the first boundary point with a second threshold and,
in a case in which the variance of the edge directions of the peripheral pixels at the first boundary point is equal to or smaller than the second threshold, the correction unit changes the width of the undefined area at the first boundary point so that the difference becomes small.

12. An image processing method comprising:
acquiring a boundary between a target area and a non-target area from an image;
calculating edge directions of the peripheral pixels of each boundary point of a plurality of boundary points on the boundary and a variance of the edge directions;
determining a width of an undefined area at each boundary point of the plurality of boundary points based on distribution of the variance of the edge directions of the peripheral pixels of the boundary point;
setting the undefined area for which the width is determined at each boundary point, on the periphery of the boundary; and
defining an area excluding the undefined area from the target area as the foreground area, define an area excluding the undefined area from the non-target area as the background area, and generate area information that specifies the foreground area, the background area, and the undefined area.

13. A non-transitory computer readable storage medium in which an image processing program for making a computer execute an image processing method comprising:
acquiring a boundary between a target area and a non-target area from an image;
calculating edge directions of the peripheral pixels of each boundary point of a plurality of boundary points on the boundary and a variance of the edge directions;
determining a width of an undefined area at each boundary point of the plurality of boundary points based on distribution of the variance of the edge directions of the peripheral pixels of the boundary point;

setting the undefined area for which the width is determined at each boundary point, on the periphery of the boundary; and defining an area excluding the undefined area from the target area as the foreground area, define an area excluding the undefined area from the non-target area as the background area, and generate area information that specifies the foreground area, the background area, and the undefined area.

* * * * *